March 28, 1967 R. SCHEUFLER 3,311,428
BEARING FOR CLOSELY HELD JOURNAL
Filed April 30, 1964 3 Sheets-Sheet 1
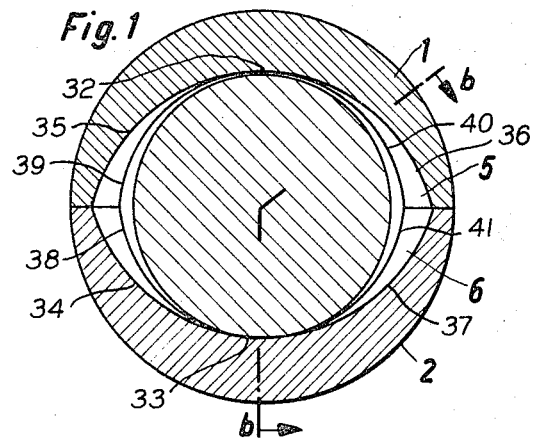
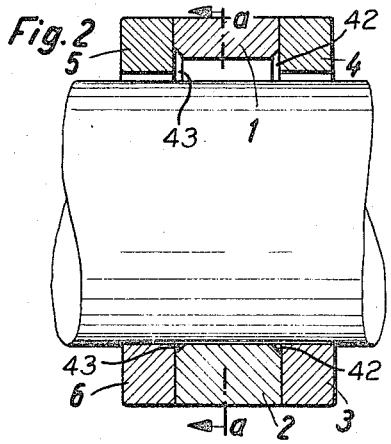
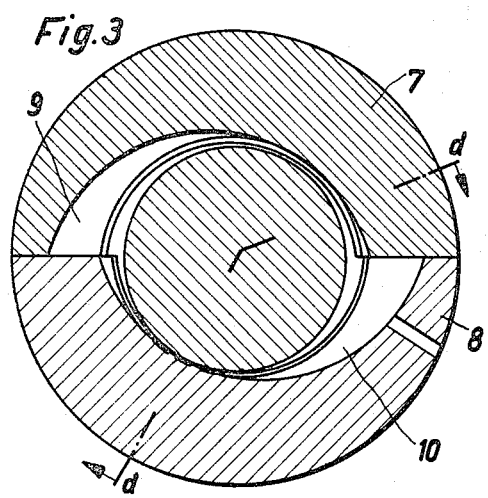
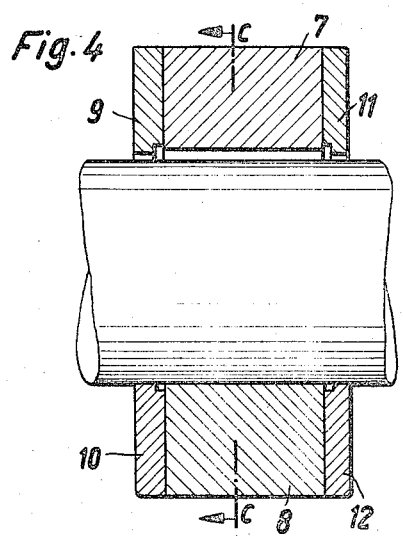
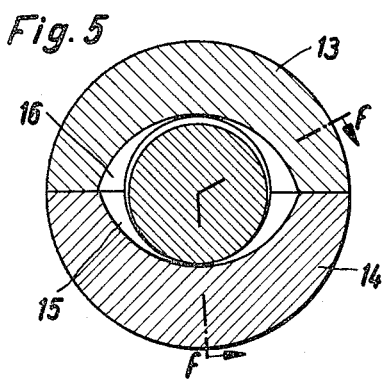
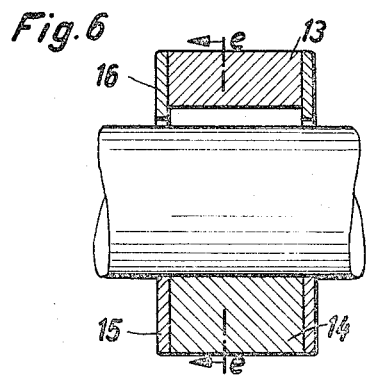
Inventor:
ROLAND SCHEUFLER
BY
ATTORNEYS.

March 28, 1967   R. SCHEUFLER   3,311,428
BEARING FOR CLOSELY HELD JOURNAL
Filed April 30, 1964   3 Sheets-Sheet 2

Inventor:
ROLAND SCHEUFLER
BY
ATTORNEYS.

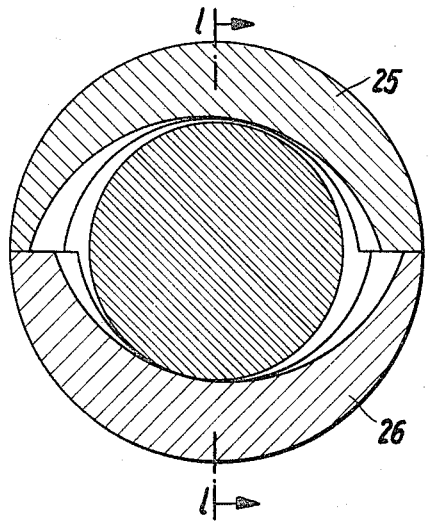
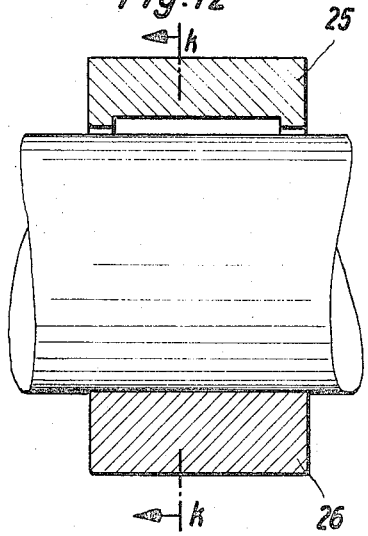
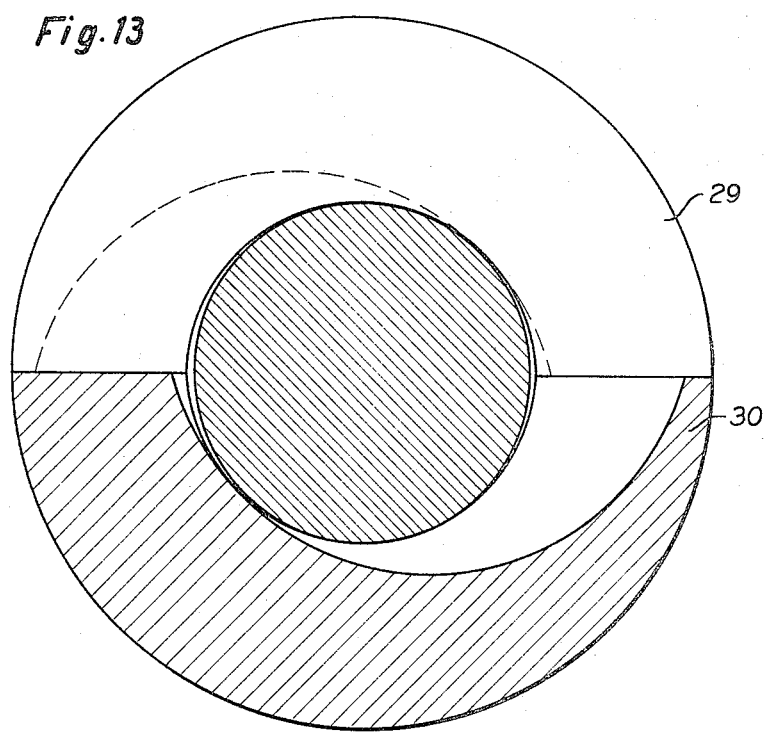

United States Patent Office 3,311,428
Patented Mar. 28, 1967

3,311,428
BEARING FOR CLOSELY HELD JOURNAL
Roland Scheufler, Neckarsulm, Wurttemberg, Germany, assignor to Firma Karl Schmidt G.m.b.H., Neckarsulm, Wurttemberg, Germany, a German corporation
Filed Apr. 30, 1964, Ser. No. 363,864
Claims priority, application Germany, June 25, 1963, Sch 33,454
16 Claims. (Cl. 308—121)

For the achievement of great bearing accuracy and for the noise-free operation of journals, friction bearings are used today whose bores are of oval form. Sometimes electroplating is also applied to the load-bearing friction surfaces for the purpose of further improving the ability of the various bearing materials to withstand severe operating conditions, especially operation at below-normal bearing temperatures.

Experiments with aluminum solid-wall bearings and bearings using steel plated friction bearing shells in light-metal bodies have shown that the expensive electroplating is essential in order to avoid bearing damage such as can occur, for example, at low temperatures. Since the installed clearance is considerably reduced at low temperatures, the starting of the motor or engine is made possible only by electroplated friction surfaces. Precision journal bearings require tight installed clearances, especially in the case of light-metal bearing bodies, since the bearing clearances provided at the time of installation are enlarged under running conditions due to the unequal expansion of the bearing body and of the steel shaft mounted therein. This enlargement of the bearing clearances is intolerable, however, because it increases the amount of bearing noise.

For this reason, friction bearings with circular bores are not suited for use where the journal is to be closely held, because, in order to assure reliable bearing operation, the installed clearance of a cylindrical bearing has to be significantly larger than the installed clearance of an ovalized bearing. In the ovalized bearings of the prior art, the journal can be very closely held, because the greater clearance gaps in the parting line areas enable the oil, which is still viscous at the time an internal combustion engine, for example, is started, to penetrate to the interior of the bearing. This very favorable characteristic which the ovalized bearing has for the starting of the engine has an unfavorable effect, however, on the dynamic performance of the bearing in the running state, because the lubricating oil is thinned by the rising temperatures and can thus flow more easily out of the said parts of the bearing. In the case of split bearings, the loss of lubricating oil is additionally promoted by the fact that oil passages through which lubricating oil can escape from the bearing are present at the interface areas of the shells.

Therefore, in the construction of friction bearings with friction surfaces that are oval in cross-section, attention must primarily be given to the prevention of the departure of the oil. To achieve this, the bearing ovality could be reduced. This, however, results in an increase of the bearing clearance in the direction of loading, since these two factors are closely interrelated or mutually dependent, and they are of great importance for the building up of an oil film in the bearing. The use of oval bearings for closely held journals for these reasons cannot be achieved by the knowledge and means of the prior art with the ovality most favorable to the dynamic performance of the bearing.

In order to achieve this, and especially to be able to use oval friction bearings for bearing designs of this sort, without electroplated friction coatings, on a reliable basis, it is proposed according to the invention to apply to the two end surfaces of an oval friction bearing shell pairs or rings whose bores are less oval than the bearing bores of the friction bearing located between them. The inside bores of these shell pairs or rings disposed laterally on the end surfaces are preferably made equal in size to the centrally disposed bore, as measured over the bearing apex, i.e., in the plane of the narrowest fit, while otherwise they have a slighter ovality. See FIG. 1 which is discussed below. Thus it is possible, independently of the shape or the degree of ovality of the friction bearing between them, to control or more or less impede the departure of the lubricating oil from the bearing by varying the thickness of the shells or rings and end members of different bore contour.

By the arrangement of the shells on bearing sleeves as prescribed by the invention, cavities are formed by the inside bore of the bearing sleeves and their end pieces, which make it possible to feed the bearing with lubricant to build up the oil film in the bearing, both while the engine is running and during starting, without using additional lubricating systems and oil grooves.

It is, of course, also possible to produce such a combination bearing in one piece, i.e., to machine the different ovalities into the individual shells of a friction bearing shell pair.

FIGS. 1 to 13 show embodiments of the invention.

FIG. 1 shows the section on line *a—a* in FIG. 2 of the shell pair 1 and 2 shown in FIG. 2, with medium-oval shells 3, 4, 5 and 6 disposed at the ends and providing end covers for the bearing.

FIG. 2 shows the section on line *b—b* in FIG. 1 of the shell pair shown in FIG. 1.

FIG. 3 shows the section on line *c—c* in FIG. 4 of an offset-oval shell pair 7 and 8 with medium-oval shells 9 and 10 disposed at the ends.

FIG. 4 is the section on line *d—d* in FIG. 3 of the shell pair 7 and 8 illustrated in FIG. 3, with the medium-oval shells 9, 10, 11 and 12 disposed at the ends.

FIG. 5 shows the section on line *e—e* in FIG. 6 of a medium-oval shell pair 13 and 14 with cylindrical bearing shells 15 and 16 disposed at the ends.

FIG. 6 shows the section on line *f—f* of the shell pair shown in FIG. 5, with laterally disposed cylindrical shells 15, 16, 17 and 18.

Figure 9:
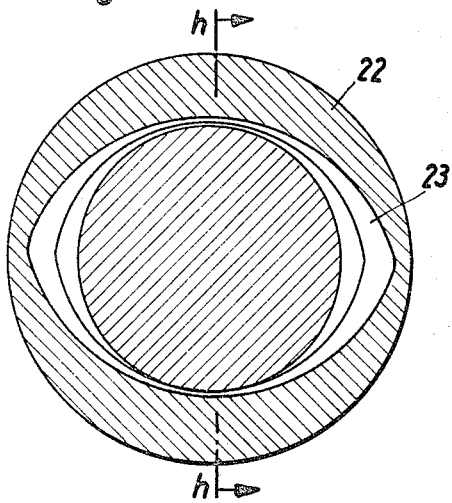
Figure 10:
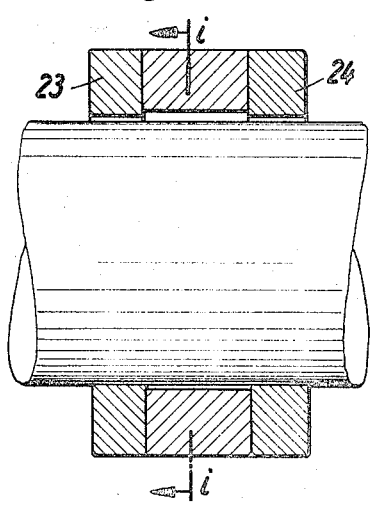

FIG. 9 shows the section on line *i—i* in FIG. 10 of the medium-oval bearing bushing 22 shown in FIG. 10, with laterally disposed rings 23 and 24, the wall thickness of the bushing lying between them being made smaller than the wall thickness of the laterally disposed rings measured at corresponding angular positions.

FIG. 10 shows the section on line h—h in FIG. 9 of the medium-oval bearing bushing 22 shown in FIG. 9 with laterally disposed medium-oval rings 23 and 24.

Figure 7:
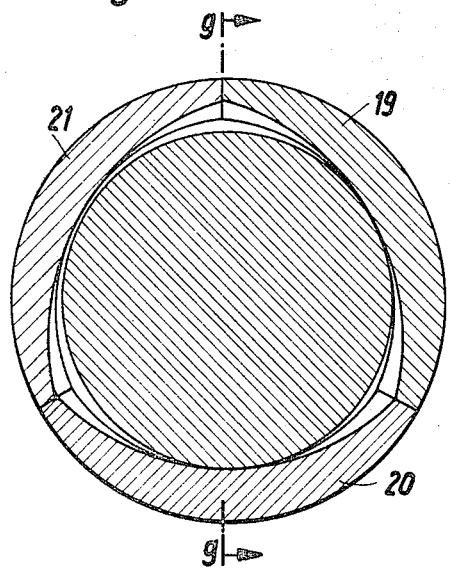
FIG. 7 shows a cross-section of a multiple-shell bearing with the parts 19, 20 and 21, the oval arcs in the shell segments being machined into the segments.

FIG. 11 shows the section on line k—k in FIG. 12 of the offset-oval shell pair 25 and 26 shown in FIG. 12. As in the embodiment of FIG. 7 the oval arcs in the various segments are machined in so that oval arcs of different contours are machined into each segment.

FIG. 12 is a section on line l—l in FIG. 11 of the shell pair 25 and 26 shown in FIG. 11.

FIG. 13 shows a split friction bearing with the shells 29 and 30. The upper shell is represented in elevation, while the lower shell 30 is shown in cross-section through the shell. The bore has an offset-oval shape in the central area of the bearing width, while at the ends of the bearing, near-circular ovals are provided. The shortest diameter of the offset oval is angularly offset from the shortest diameters of the near-circular ovals. When the bearing is designed in this manner, the journal can be held very closely at four points on its circumference.

Thus the invention provides an improvement in a sliding surface bearing having a bore shaped for sliding surface contact with a journal received therein at spaced loci, such a loci 32, 33 in FIG. 1, about the periphery of the bearing. Thus journal supporting loci are provided at 32, 33, and journal unsupporting loci are provided at 34, 35, 36, 37. According to the invention, cover plates made up of the pairs 3, 4 and 5, 6, are provided on the ends of the bearing and each cover plate has a bore for receiving a journal which is journaled in the sliding surface bearing. The bore of each cover is smaller than the bore of the sliding surface bearing at the loci 38, 39, 40, 41, which correspond to the unsupporting loci of the sliding surface bearing bore.

Figure 8:
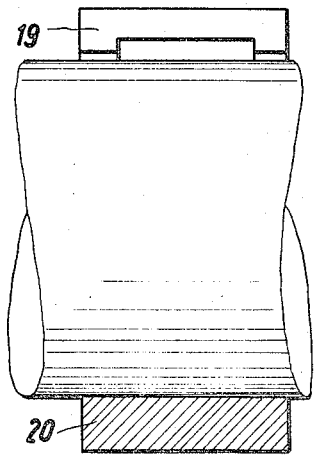
FIG. 8 shows the section on line *g—g* in FIG. 7 of the multiple-shell bearing shown in FIG. 7.

Desirably the cover plates and sliding surface bearings are of the same material and the clearance of the covers and bearing are the same. Such a construction is shown in FIGS. 1, 7, 11, and 13. In FIG. 1 the clearance of the covers at loci corresponding to the supporting loci of the bearing, is equal to the clearance of the sliding surface bearing, and the same can be said for FIGS. 7 and 11. Further it is desirable that corresponding parts of the covers and bearings be integral as is shown in FIGS. 8 and 12.

The material of the bearing is preferably a light metal such as aluminum or aluminum alloy, and can be, and preferably is, of uniform composition, i.e. without a special surface as can be provided by electroplating. The cover plates can be of the same material as the bearing.

By the present invention it is furthermore possible, through the end chamfers of the inside holes of the shells located between them to produce in a very simple manner a connection between the individual shell pairs, so that the frequently found revolving outside grooves in the bearings and in the body holes can be eliminated, and so can the use of an oil hole, for example, in the upper shell of a shell pair. This is of great advantage as regards the load-carrying capacity of the bearing, since the load-carrying friction surfaces of the bearing are not diminished in this case. Thus, in the bearing of FIG. 1 and FIG. 2 the chamfers 42, 43 are provided. See FIG. 2.

Where reference is made to "clearance," unless the context otherwise requires, the cold condition is referred to. For the bearing according to the invention any material can be used.

What is claimed is:

1. In a sliding surface radial bearing having a bore shaped for sliding surface contact with a journal received therein at spaced loci about the periphery thereof to provide journal supporting and journal unsupporting loci in the bore, the improvement which comprises a metallic cover plate coaxial with the bearing mounted on each end thereof, said covers each having a bore for receiving a journal received in the sliding surface bearing, the bore of each cover being substantially equal to the bore of the bearing at loci thereof corresponding to loci of sliding surface contact between the shaft and bearing, and smaller than the bore of the sliding surface bearing at loci thereof corresponding to unsupporting loci in the sliding surface bearing bore, but larger at loci thereof corresponding to unsupported loci of the sliding surface bearing bore than the bore of the bearing at loci of sliding surface contact between the shaft and bearing, whereby escape of lubricant from the sliding surface bearing bore is impeded.

2. Sliding surface bearing according to claim 1, the cover plates and sliding surface bearings being of the same material and the clearance of the sliding surface bearing and the cover plates being the same.

3. Sliding surface bearing according to claim 1, the clearance of the covers at loci thereof corresponding to supporting loci of the sliding surface bearing being equal to the clearance of the sliding surface bearing.

4. Sliding surface bearing according to claim 1, corresponding parts of the covers and sliding surface bearing being integral.

5. Sliding surface bearing according to claim 1, there being an inwardly disposed chamfer at the junction of each cover and the sliding surface bearing.

6. Sliding surface bearing according to claim 2, there being an inwardly disposed chamfer at the junction of each cover and the sliding surface bearing.

7. A sliding surface radial bearing and a journal disposed therein, said bearing having a bore in sliding surface contact with the journal received therein at spaced loci about the periphery thereof to provide journal supporting and journal unsupporting loci in the bore, the improvement which comprises a metallic cover plate coaxial with the bearing mounted on each end thereof, said covers each having a bore for receiving the journal received in the sliding surface bearing, the bore of each cover being substantially equal to the bore of the bearing at loci thereof corresponding to loci of sliding surface contact between the shaft and bearing, and smaller than the bore of the sliding surface bearing at loci thereof corresponding to unsupporting loci in the sliding surface bearing bore, but larger at loci thereof corresponding to unsupported loci of the sliding surface bearing bore than the bore of the bearing at loci of sliding surface contact between the shaft and bearing, whereby escape of lubricant from the sliding surface bearing bore is impeded.

8. Sliding surface bearing according to claim 7, the cover plates and sliding surface bearings being of the same material and the clearance of the sliding surface bearing and the cover plates being the same.

9. Sliding surface bearing according to claim 7, the clearance of the covers at loci thereof corresponding to supporting loci of the sliding surface bearing being equal to the clearance of the sliding surface bearing.

10. Sliding surface bearing according to claim 7, corresponding parts of the covers and sliding surface bearing being integral.

11. Sliding surface bearing according to claim 7, there being an inwardly disposed chamfer at the junction of each cover and the sliding surface bearing.

12. Sliding surface bearing according to claim 8, there being an inwardly disposed chamfer at the junction of each cover and the sliding surface bearing.

13. A sliding surface bearing according to claim 1, the bearing being of uniform composition and of material selected from the group consisting of aluminum and aluminum alloys.

14. A sliding surface bearing and journal according to claim 7, the bearing being of uniform composition and of material selected from the group consisting of aluminum and aluminum alloys.

15. A sliding surface bearing and shaft according to claim 14, the journal being steel.

16. A sliding surface radial bearing and a journal disposed therein, said journal according to claim 7, said journal being disposed horizontally, the cover plates and sliding surface defining a sump for lubricant for the lower part of the shaft.

References Cited by the Examiner

UNITED STATES PATENTS

| | | | |
|---|---|---|---|
| 1,236,511 | 8/1917 | Waring | 308—240 |
| 1,254,909 | 1/1918 | Howe | 308—121 |
| 3,201,183 | 12/1962 | Buske | 308—121 |

FOREIGN PATENTS

| | | |
|---|---|---|
| 194,660 | 1/1958 | Austria. |
| 1,301,718 | 7/1962 | France. |
| 702,033 | 1/1954 | Great Britain. |

OTHER REFERENCES

Product Engineering, February 1946, pages 128–130 relied on.

MARTIN P. SCHWADRON, *Primary Examiner.*

FRANK SUSKO, DAVID J. WILLIAMOWSKY,
*Examiners.*